F. M. VOGEL.
ELECTRIC METER.
APPLICATION FILED SEPT. 14, 1904.

941,436.

Patented Nov. 30, 1909.

WITNESSES:

INVENTOR
Frederick M. Vogel,
by
Atty.

UNITED STATES PATENT OFFICE.

FREDERICK M. VOGEL, OF LYNN, MASSACHUSETTS, ASSIGNOR TO GENERAL ELECTRIC COMPANY, A CORPORATION OF NEW YORK.

ELECTRIC METER.

941,436.  Specification of Letters Patent.  Patented Nov. 30, 1909.

Application filed September 14, 1904. Serial No. 224,361.

*To all whom it may concern:*

Be it known that I, FREDERICK M. VOGEL, a citizen of the United States, residing at Lynn, in the county of Essex and State of Massachusetts, have invented certain new and useful Improvements in Electric Meters, of which the following is a specification.

My invention relates to meters for electric currents and its object is to provide a simple and accurate meter for measuring the watts in an electric circuit carrying alternating current.

I have discovered that if a meter is made up of a rotatable member and two magnetic circuits acting thereon, each completely surrounded by shunt and series windings, the two windings, acting in conjunction on one magnetic circuit and in opposition on the other, together with torque-producing means energized inductively by the current induced in the rotatable member, such an arrangement will measure the true energy in alternating-current circuits provided the coöperating torque-producing means are so located that the torques produced at the two magnetic circuits oppose each other.

It is well understood in the art that if a rotatable disk be subjected to an alternating current flux and if a stationary short-circuited conductor be placed adjacent to the disk and in inductive relation thereto, the currents induced by the flux in the disk and in the conductor will exert a mutual torque tending to rotate the disk. By providing in coöperative relation to each magnetic circuit two similar torque-producing means in the shape of two similar short-circuited conductors subjected to a flux proportional to one of the factors to be measured, such as the potential, and positioning the conductors so that they exert equal and opposite torques upon the disk and providing means for producing a flux proportional to the other factor of the quantity to be measured, such that the flux through one of the secondaries is increased and that through the other is diminished, an unbalancing of the torques is consequently produced proportional to the product of both factors, and the resultant torque consequently varies directly with the watts in the circuit.

My invention consists in a novel arrangement of the meter windings adapted to produce an operation of the meter in accordance with the above principles.

My invention will best be understood by reference to the accompanying drawings, in which—

Figure 1:
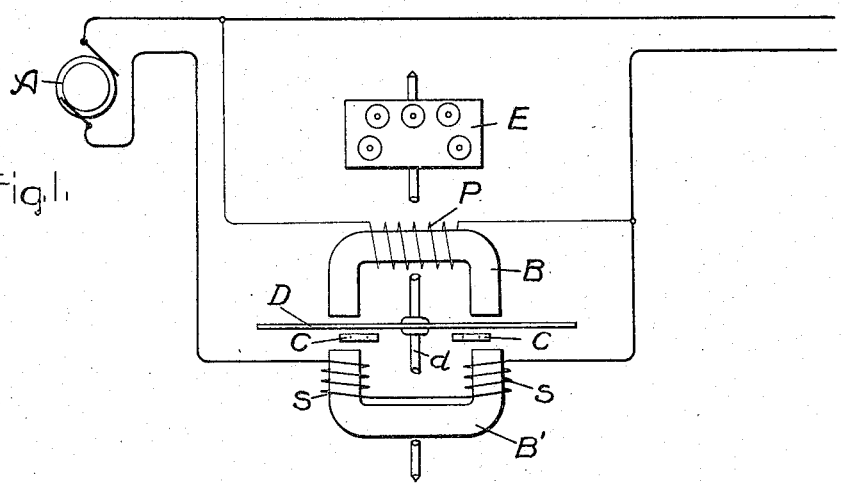
Figure 2:
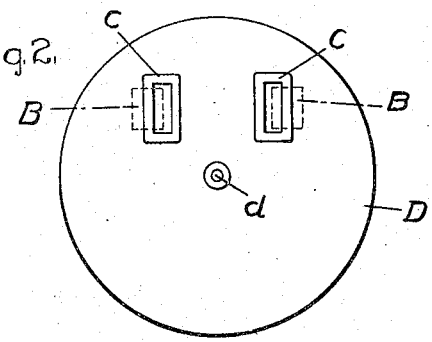
Figure 3:
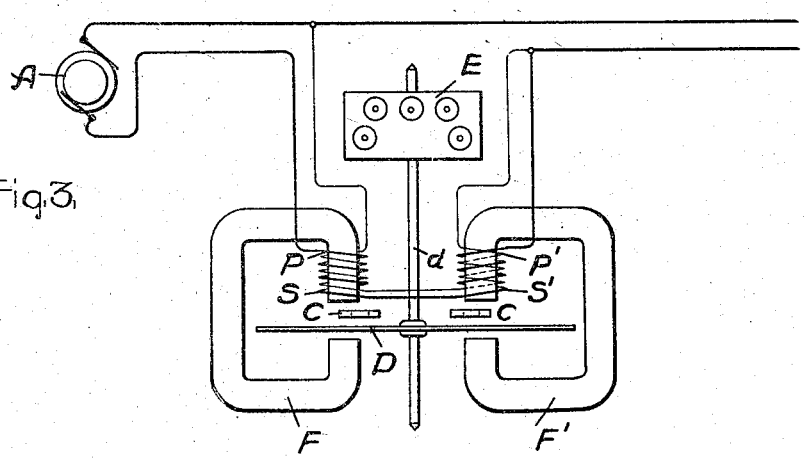

Figure 1 shows somewhat diagrammatically a meter arranged in accordance with my invention; Fig. 2 shows a view looking upward from below the disk, clearly indicating the position of the short-circuited conductor; and Fig. 3 shows a modification in which the fluxes threading the two short-circuited conductors are entirely independent.

Referring first to Figs. 1 and 2, A represents a source or reservoir of alternating current, the output or input of which is to be measured. P represents a potential coil connected in shunt to the apparatus A and mounted on a U-shaped core B. B' represents a second U-shaped core facing the first and carrying two series coils S S. D represents a conducting disk rotatably mounted between the two cores on the shaft $d$. C C represent two short-circuited conductors positioned as shown in Fig. 2. E represents the usual recording mechanism driven by the disk D. It will be seen that the flux produced by the potential coil P will induce currents both in disk D and in the conductors C C. Furthermore, a torque will be produced between the currents in the disk D and the current in each conductor C, but since the conductors C C are oppositely and symmetrically displaced with reference to the poles of the core B and since they are equi-distant from shaft $d$, the torques exerted by the conductors upon the disk due to the potential flux will be equal and opposite. No rotation will be produced as long as no current is flowing through the series coils S S.

It will be seen that the series coils S S are wound oppositely with respect to core B', that is, they tend to produce the same polarities at both poles of the core B'. The potential coil P on the other hand produces unlike polarities at the poles of the core B, and consequently one of the series coils S acts to weaken the flux through the closed conductor C opposite to it, while the other coil acts to strengthen the flux through the other conductor C. The balance between the torques exerted by the two conductors C through the medium of the current induced in the disk is thus destroyed and a resultant torque is produced proportional both to the flux produced by the potential coil and that flux produced by the component of current in the series coils in phase with the voltage. In other words, the meter accurately measures the watts in the circuit.

It will be seen that since the series coils completely surround the magnetic paths of the shunt fluxes cutting the disk, no torque whatever would be produced if it were not for the short-circuited conductors C. If these conductors were removed, there would simply be two independent pulsating fluxes threading the disk, which would induce currents in the disk which would be symmetrical with respect to each point at which the disk was threaded by the fluxes, and the fluxes produced by the induced secondary currents would also be symmetrical with respect to the inducing fluxes. When the short-circuited conducting members, however, are placed in position, the fluxes due to the induced currents in the disk are distorted with respect to the inducing fluxes, and this distortion of the secondary flux with respect to the inducing fluxes, and consequently with respect to the secondary induced current, results in effective torque.

Fig. 3 shows a modification in which the fluxes threading the two coils C C are entirely distinct. Two C-shaped cores F F' are employed, each arranged with its poles on opposite sides of the disk adjacent to one of the conductors C C. Two potential coils and two series coils are employed, the core F carrying the potential coil P and the series coil S, and the core F' carrying the similar coils P' and S'. The two coils S and S' are oppositely wound with reference to the potential coils, as in the former arrangement, and the operation is the same as has already been described, the potential coils tending to produce equal fluxes through the short-circuited conductors which in turn produce opposing torques, and the series coils acting to strengthen the flux through one short-circuited conductor and to weaken it through the other. When the two magnetic circuits are distinct, as in Fig. 3, it is obvious that they need not be arranged to act upon the same disk, as long as they act on the same rotatable member so that a resultant torque equal to the difference of the two torques is secured.

Other modifications may be employed without departing from the spirit of my invention and I aim in the appended claims to cover all such modifications.

What I claim as new and desire to secure by Letters Patent of the United States, is,

1. In a meter for alternating currents, a rotatable conducting member, potential windings arranged to produce normally equal fluxes threading said member at two places, two similar short-circuited conductors arranged to be energized by said fluxes and displaced therefrom symmetrically but oppositely, and series windings completely surrounding the magnetic paths for the potential fluxes and arranged to oppose the potential flux at one place and assist it at the other.

2. In a meter for alternating currents, a rotatable conducting member, potential windings arranged to produce normally equal fluxes threading said member at two places, two similar short-circuited conductors arranged to be energized by said fluxes and displaced therefrom symmetrically but oppositely, and series windings completely surrounding the magnetic paths for the potential fluxes and arranged to vary the relative strength of the fluxes threading said conductors.

3. In an alternating-current meter, a rotatable conducting member, potential windings, series windings completely surrounding the magnetic paths of the fluxes produced by the potential winding and arranged to produce with the potential windings joint fluxes threading said member at two places, said windings opposing each other at one place and assisting each other at the other place, and two similar short-circuited conductors arranged to be energized by said fluxes respectively and displaced symmetrically but oppositely therefrom.

4. In an alternating-current meter, a rotatable conducting member, two independent magnetic circuits threading said member, potential windings, series windings completely surrounding the magnetic paths of the fluxes produced by the potential windings and arranged to assist the potential winding in energizing one of said circuits and to oppose the potential winding in energizing the other circuit, and two similar short-circuited conductors adjacent to said rotatable member and symmetrically but oppositely displaced from the axes of said magnetic circuits.

5. In an alternating-current meter, a rotatable conducting member, two magnetic circuits threading said member, potential windings, series windings completely surrounding the magnetic paths of the fluxes produced by the potential windings and arranged to assist the potential winding in energizing one of said circuits and to oppose the potential winding in energizing the other circuit, and short-circuited conductors adjacent to said rotatable member and oppositely displaced from the axes of said magnetic circuits.

6. In an alternating-current meter, a rotatable conducting member, two magnetic circuits threading said member, potential windings, series windings completely surrounding the magnetic paths of the fluxes produced by the potential windings and arranged to assist the potential winding in energizing one of said circuits and to oppose the potential winding in energizing the other circuit, and a short-circuited conductor operatively related to each of said magnetic circuits, the said conductors being located adjacent to the rotatable member and so positioned with respect to the axes of the magnetic circuits as to produce opposing torques on the said member.

7. In a meter for alternating currents, a rotatable conducting member, two magnetic circuits threading said member, shunt and series windings for each magnetic circuit, the series winding surrounding the magnetic path of the shunt flux in each circuit and opposing said flux in one circuit and assisting it in the other, and torque-producing means separated from the said magnetic circuits and displaced in relation thereto, in inductive relation to the secondary currents induced in said rotatable member and coöperating therewith to produce opposing torques on said member.

8. In a meter for alternating-currents, a rotatable conducting member, two independend magnetic circuits threading said member, shunt and series windings for each circuit, the series winding surrounding the magnetic path of the shunt flux in each circuit and opposing said flux in one circuit and assisting it in the other, and means separated from said magnetic circuits and displaced in relation thereto for reacting upon the flux produced by the induced currents in said member.

9. In a meter for alternating-currents, a rotatable conducting member, two independend magnetic circuits threading said member, shunt and series windings for each circuit, the series winding surrounding the magnetic path of the shunt flux in each circuit and opposing said flux in one circuit and assisting it in the other, and means separate from the said magnetic circuits and displaced in opposite directions with respect to each of said magnetic circuits for reacting upon the flux produced by the induced currents in said member.

In witness whereof, I have hereunto set my hand this eighth day of September, 1904.

FREDERICK M. VOGEL.

Witnesses:
JOHN A. MCMANUS, Jr.,
HENRY O. WESTENDARP.